US008589071B2

(12) United States Patent
Feyereisen et al.

(10) Patent No.: US 8,589,071 B2

(45) Date of Patent: Nov. 19, 2013

(54) AIRCRAFT VISION SYSTEM INCLUDING A RUNWAY POSITION INDICATOR

(75) Inventors: Thea L. Feyereisen, Hudson, WI (US); Ivan Sandy Wyatt, Scottsdale, AZ (US); Gang He, Morristown, NJ (US); Glenn Connor, Laurel, MD (US)

(73) Assignee: Honeywell International Inc., Morristown, NJ (US)

( * ) Notice: Subject to any disclaimer, the term of this patent is extended or adjusted under 35 U.S.C. 154(b) by 43 days.

(21) Appl. No.: 13/210,171

(22) Filed: Aug. 15, 2011

(65) Prior Publication Data

US 2013/0046462 A1 Feb. 21, 2013

(51) Int. Cl.
*G01C 21/00* (2006.01)
*G01C 23/00* (2006.01)

(52) U.S. Cl.
USPC ............... 701/457; 701/14; 701/16; 701/436; 701/455; 340/972; 340/973; 340/976

(58) Field of Classification Search
USPC .............. 340/972, 973, 976; 701/14, 16, 3, 4, 701/436, 455, 457
See application file for complete search history.

(56) References Cited

U.S. PATENT DOCUMENTS

| | | | |
|---|---|---|---|
| 4,368,517 A | 1/1983 | Lovering | |
| 5,343,395 A | 8/1994 | Watts | |
| 5,593,114 A | 1/1997 | Ruhl | |
| 5,657,009 A | 8/1997 | Gordon | |
| 5,745,863 A | 4/1998 | Uhlenhop et al. | |
| 6,317,059 B1 | 11/2001 | Purpus et al. | |
| 6,591,171 B1 * | 7/2003 | Ammar et al. | 701/16 |
| 6,711,479 B1 | 3/2004 | Staggs | |
| 6,952,632 B2 * | 10/2005 | Robert et al. | 701/16 |
| 7,089,092 B1 * | 8/2006 | Wood et al. | 701/14 |
| 7,209,053 B2 | 4/2007 | Gannon | |
| 7,216,069 B2 * | 5/2007 | Hett | 703/6 |
| 7,522,977 B2 | 4/2009 | Foucart et al. | |
| 7,617,022 B1 * | 11/2009 | Wood et al. | 701/3 |
| 7,772,994 B2 * | 8/2010 | He | 340/976 |
| 7,852,236 B2 | 12/2010 | Feyereisen et al. | |
| 7,869,943 B1 * | 1/2011 | Simon | 701/436 |
| 7,908,082 B2 * | 3/2011 | Clark et al. | 701/457 |

(Continued)

FOREIGN PATENT DOCUMENTS

| | | | |
|---|---|---|---|
| EP | 2309474 A1 | 4/2011 | |
| EP | 2317488 A2 | 5/2011 | |

OTHER PUBLICATIONS

EP Communication, EP 12178888.9-2215 dated Jan. 15, 2013.
EP Search Report, EP 12178888.9-2215 dated Dec. 18, 2012.

*Primary Examiner* — Thomas Black
*Assistant Examiner* — Wae Louie
(74) *Attorney, Agent, or Firm* — Ingrassia Fisher & Lorenz, P.C.

(57) ABSTRACT

A runway indicator is displayed overlying a target runway for providing supplementary guidance to support the pilot's ability to fly a stabilized approach. The highlighted runway position indicator provides cues to verify that the aircraft is continuously in a position to complete a normal landing using normal maneuvering during the instrument segment of an approach and includes a landing threshold, a landing zone on the runway, an approach line leading to the runway, an outline highlighting the sides and ends of the runway, a rectangle larger than and surrounding the runway, and a visual precision path approach indicator.

15 Claims, 6 Drawing Sheets

(56) References Cited

U.S. PATENT DOCUMENTS

| | | | | |
|---|---|---|---|---|
| 8,060,262 | B2 * | 11/2011 | Burgin et al. | 701/16 |
| 8,219,265 | B2 * | 7/2012 | Dwyer et al. | 701/4 |
| 8,306,745 | B1 * | 11/2012 | Clark et al. | 701/455 |
| 2003/0132860 | A1 * | 7/2003 | Feyereisen et al. | 340/973 |
| 2003/0225487 | A1 * | 12/2003 | Robert et al. | 701/4 |
| 2005/0182528 | A1 * | 8/2005 | Dwyer et al. | 701/3 |
| 2005/0246071 | A1 * | 11/2005 | Chamas et al. | 701/3 |
| 2007/0088491 | A1 * | 4/2007 | He | 701/120 |
| 2007/0106433 | A1 | 5/2007 | He | |
| 2008/0074338 | A1 * | 3/2008 | Vacanti | 343/771 |
| 2008/0106438 | A1 * | 5/2008 | Clark et al. | 340/972 |
| 2010/0036552 | A1 * | 2/2010 | Pepitone et al. | 701/18 |
| 2010/0082187 | A1 | 4/2010 | Nichols et al. | |
| 2010/0250030 | A1 * | 9/2010 | Nichols et al. | 701/7 |
| 2010/0321488 | A1 * | 12/2010 | Soler | 348/115 |
| 2012/0130624 | A1 * | 5/2012 | Clark et al. | 701/117 |

* cited by examiner

AIRCRAFT VISION SYSTEM INCLUDING A RUNWAY POSITION INDICATOR

TECHNICAL FIELD

The present invention generally relates to a system for improving a pilot's ability to complete an approach to a runway and more particularly to a system for displaying information to support a pilot's ability to fly a stabilized approach.

BACKGROUND

The approach to landing and touch down on the runway of an aircraft is probably the most challenging task a pilot undertakes during normal operation. To perform the landing properly, the aircraft approaches the runway within an envelope of attitude, course, speed, and rate of descent limits. The course limits include, for example, both lateral limits and glide slope limits. An approach outside of this envelope can result in an undesirable positioning of the aircraft with respect to the runway, resulting in possibly discontinuance of the landing attempt.

In some instances visibility may be poor during approach and landing operations, resulting in what is known as instrument flight conditions. During instrument flight conditions, pilots rely on instruments, rather than visual references, to navigate the aircraft. Even during good weather conditions, pilots typically rely on instruments to some extent during the approach. Many airports and aircraft include runway assistance landing systems, for example an Instrument Landing System (ILS), to help guide aircraft during approach and landing operations. These systems allow for the display of a lateral deviation indicator to indicate aircraft lateral deviation from the approach course, and the display of a glide slope indicator to indicate vertical deviation from the glide slope.

Because of poor ground infrastructure, there are limits to how low a pilot may descend on approach prior to making visual contact with the runway environment for runways having an instrument approach procedure. Typical low visibility approaches require a combination of avionics equipage, surface infrastructure, and specific crew training. These requirements limit low visibility approaches to a small number of runways. For example, typical decision heights above ground (whether to land or not) for a Non-Directional beacon (NDB) approach is 700 feet above ground, while a VHF Omni-directional radio Range (VOR) approach is 500 feet, a Global Positioning System (GPS) approach is 300 feet, Local Area Augmentation System (LAAS) is 250 feet, and an ILS approach is 200 feet. A sensor imaging system may allow a descent below these altitude-above-ground figures, for example, 100 feet lower on an ILS approach, because the pilot is performing as a sensor, thereby validating position integrity by seeing the runway environment. However, aircraft having an imaging system combined with a heads up display are a small percentage of operating aircraft, and there is a small percentage of runways with the ILS and proper airport infrastructure (lighting and monitoring of signal).

Synthetic vision systems are currently certified for situation awareness purposes in commercial and business aviation applications with no additional landing credit for going below published minimum. Such a display system, when used in conjunction with flight symbology such as on a head-up display system, is known to improve a pilot's overall situational awareness and reduce flight technical errors. However, two concerns related to a synthetic vision system are 1) the lacking of or insufficient separated integrity verification for the displayed information, and 2) the lack of sufficient integrity or short-term critical availability during the final approach phase of data sources used to generate the visual display elements for navigation and verification purposes.

Accordingly, it is desirable to provide a system and method for improving the ability to fly low altitude, low visibility approaches including displaying information supporting a pilot's ability to fly a stabilized approach. Furthermore, other desirable features and characteristics of the present invention will become apparent from the subsequent detailed description of the invention and the appended claims, taken in conjunction with the accompanying drawings and this background of the invention.

BRIEF SUMMARY

A runway indicator is/are provided for displaying over a displayed runway for assisting a pilot in completing an approach to landing on a runway. The runway indicator enables the pilot to continue on a normal path to an intended runway for landing by providing advanced instrumentation cues that improve the accuracy and safety of the approach and landing.

In one exemplary embodiment, the apparatus comprises a vision system comprising a system configured to determine the position of a target runway; and a display coupled to the system and configured to display a conformal runway representing the target runway and a highlighted runway indicator, the conformal runway having an approach end, a departure end, a first side, and a second side, the runway indicator comprising a threshold at the approach end; a landing zone on the runway near the approach end; a line indicating an approach course having an end terminating at the runway threshold; an outline on the approach end, departure end, first side, and second side of the runway; a rectangle surrounding the conformal runway having two sides with a distance therebetween greater than the runway width, and two ends with a distance therebetween greater than the runway length, and one of the two ends crossing the landing zone perpendicular to the target runway; and a virtual precision path approach indicator.

In another exemplary embodiment, a vision system for an aircraft comprises a runway database comprising lengths, widths, and locations of a plurality of runways; a global positioning system configured to determine data including a position and an altitude of the aircraft; an inertial navigation system configured to track changes in the position and the altitude, and to reject spurious data; a computer configured to provide approach information from one of, in the order of availability, the global positioning system and the inertial navigation system; and a display coupled to the computer and configured to display the approach information, wherein the approach information comprises a target runway, selected from the plurality of runways, including length and width from the runway database; and a highlighted runway indicator comprising a runway threshold; a landing zone; a line indicating an approach course having an end terminating at the runway threshold; an outline surrounding the edges of the runway; a rectangle surrounding the runway and having two sides with a distance therebetween greater than the runway width, and two ends with a distance therebetween greater than the runway length, and one of the two ends crossing the landing zone perpendicular to the target runway; and a virtual precision path approach indicator.

In yet another exemplary embodiment, a method for providing a runway indicator for assisting a pilot of an aircraft to complete an approach for landing comprises providing the location, width, and length of a runway; determining the position and altitude of the aircraft; displaying the runway conformally in a first format, the conformally displayed runway having an approach end, a departure end, a first side, and a second side; providing the runway indicator in a second format, comprising displaying a runway threshold at the approach end; displaying a landing zone near the runway threshold; displaying an approach course having an end terminating a the runway threshold; displaying an outline of the runway; displaying a rectangle surround the conformally displayed runway having two sides with a distance therebetween greater than the runway width, and two ends with a distance therebetween greater than the runway length, the sides positioned on opposed sides of the runway, one end positioned on the landing zone perpendicular to the runway, and the other end beyond the runway; and displaying a path approach indicator.

BRIEF DESCRIPTION OF THE DRAWINGS

The present invention will hereinafter be described in conjunction with the following drawing figures, wherein like numerals denote like elements.

DETAILED DESCRIPTION

Figure 1:
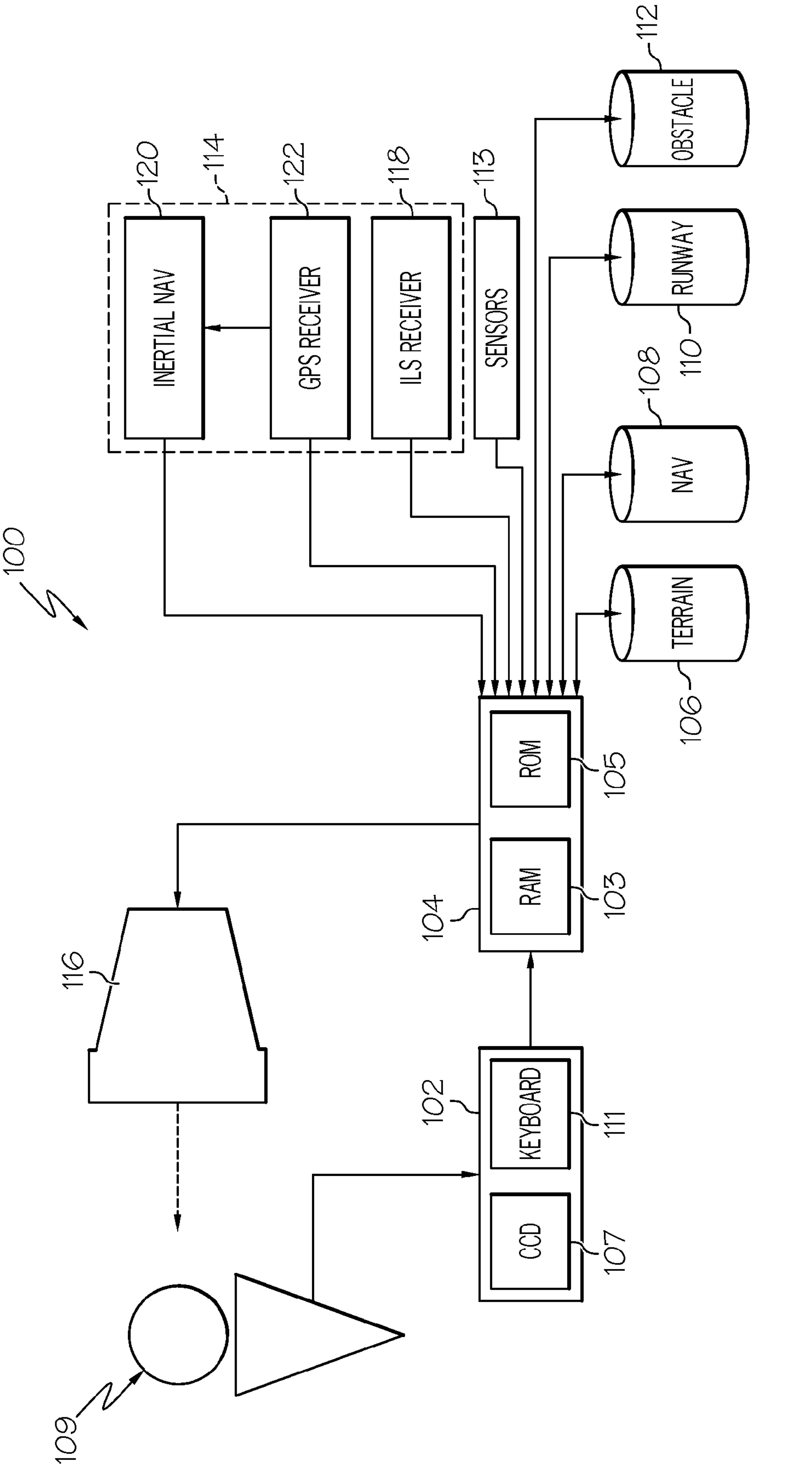
FIG. 1 is a functional block diagram of a flight display system in according with exemplary embodiments.

The following detailed description is merely illustrative in nature and is not intended to limit the embodiments of the subject matter or the application and uses of such embodiments. Any implementation described herein as exemplary is not necessarily to be construed as preferred or advantageous over other implementations. Furthermore, there is no intention to be bound by any expressed or implied theory presented in the preceding technical field, background, brief summary, or the following detailed description.

A system and method, that will allow pilots to descend to a low altitude, e.g., to 100 feet or below, includes comparing standard guidance instruments/symbology and separately generated visual display elements. The separately generated visual display elements are indicative of current aircraft state such as its true position and altitude, and are produced with the data sources substantially independent of or substantially modified from the data used in generating standard instrument guidance. The separately generated visual display elements are compared with the standard guidance to determine if the two elements differ within a threshold. The separately generated display elements use at least two data sources which can maintain its required accuracy over extended period of time when other data sources fail providing assurance to the pilot of the aircrafts position and adherence to an intended flight path. The failures may include, for example, short term GPS failure, or certain altitude output failure. The separately generated display elements combine the data sources which can define and substantially maintain its level of integrity in response to various input data failures and degradation. The separately generated display elements are presented in a different format on a primary flight display in comparison to the standard guidance elements to provide flight crews with information for integrity verification purposes.

One specific embodiment teaches a runway position indicator that provides supplementary guidance to support the pilot's ability to fly a stabilized approach. The runway position indicator provides cues to verify that the aircraft is continuously in a position to complete a normal landing using normal maneuvering during the instrument segment of an approach. Prior to the decision height or minimum descent altitude, the runway position indicator facilitates a "guided search" for the landing runway, aiding the pilot in the visual acquisition of landing runway environment as the pilot gains natural vision of the outside world. Below decision height or minimum descent altitude, the runway position indicator facilitates a "guided search" for the landing runway, further aiding the pilot in the visual acquisition of landing runway environment.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

For the sake of brevity, conventional techniques related to graphics and image processing, navigation, flight planning, aircraft controls, aircraft data communication systems, and other functional aspects of certain systems and subsystems (and the individual operating components thereof) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Referring to FIG. 1, a flight deck display system in accordance with the exemplary embodiments is depicted and will be described. The system 100 includes a user interface 102, a processor 104, one or more terrain databases 106 sometimes referred to as a Terrain Avoidance and Warning System (TAWS), one or more navigation databases 108, one or more runway databases 110 sometimes referred to as a Terrain Avoidance and Warning system (TAWS), one or more obstacle databases 112 sometimes referred to as a Traffic and Collision Avoidance System (TCAS), various sensors 113, various external data sources 114, and a display device 116. The user interface 102 is in operable communication with the processor 104 and is configured to receive input from a user 109 (e.g., a pilot) and, in response to the user input, supply command signals to the processor 104. The user interface 102 may be any one, or combination, of various known user interface devices including, but not limited to, a cursor control device (CCD) 107, such as a mouse, a trackball, or joystick, and/or a keyboard, one or more buttons, switches, or knobs. In the depicted embodiment, the user interface 102 includes a CCD 107 and a keyboard 111. The user 109 uses the CCD 107 to, among other things, move a cursor symbol on the display screen (see FIG. 2), and may use the keyboard 111 to, among other things, input textual data.

The processor 104 may be implemented or realized with a general purpose processor, a content addressable memory, a digital signal processor, an application specific integrated circuit, a field programmable gate array, any suitable programmable logic device, discrete gate or transistor logic, discrete hardware components, or any combination designed to perform the functions described herein. A processor device may be realized as a microprocessor, a controller, a microcontroller, or a state machine. Moreover, a processor device may be implemented as a combination of computing devices, e.g., a combination of a digital signal processor and a microprocessor, a plurality of microprocessors, one or more microprocessors in conjunction with a digital signal processor core, or any other such configuration.

In the depicted embodiment, the processor 104 includes preferably an on-board RAM (random access memory) 103, and on-board ROM (read only memory) 105. The program instructions that control the processor 104 may be stored in either or both the RAM 103 and the ROM 105. For example, the operating system software may be stored in the ROM 105, whereas various operating mode software routines and various operational parameters may be stored in the RAM 103. It will be appreciated that this is merely exemplary of one scheme for storing operating system software and software routines, and that various other storage schemes may be implemented.

The memory 103, 105 alternatively may be realized as flash memory, EPROM memory, EEPROM memory, registers, a hard disk, a removable disk, a CD-ROM, or any other form of storage medium known in the art. In this regard, the memory 103, 105 can be coupled to the processor 104 such that the processor 104 can be read information from, and write information to, the memory 103, 105. In the alternative, the memory 103, 105 may be integral to the processor 104. As an example, the processor 104 and the memory 103, 105 may reside in an ASIC. In practice, a functional or logical module/component of the display 116 might be realized using program code that is maintained in the memory 103, 105. The memory 103, 105 can be used to store data utilized to support the operation of the display 116, as will become apparent from the following description.

No matter how the processor 104 is specifically implemented, it is in operable communication with the terrain databases 106, the navigation databases 108, and the display device 116, and is coupled to receive various types of inertial data from the various sensors 113, and various other avionics-related data from the external data sources 114. The processor 104 is configured, in response to the inertial data and the avionics-related data, to selectively retrieve terrain data from one or more of the terrain databases 106 and navigation data from one or more of the navigation databases 108, and to supply appropriate display commands to the display device 116. The display device 116, in response to the display commands, selectively renders various types of textual, graphic, and/or iconic information. The preferred manner in which the textual, graphic, and/or iconic information are rendered by the display device 116 will be described in more detail further below. Before doing so, however, a brief description of the databases 106, 108, the sensors 113, and the external data sources 114, at least in the depicted embodiment, will be provided.

The terrain databases 106 include various types of data representative of the terrain over which the aircraft is flying, and the navigation databases 108 include various types of navigation-related data. These navigation-related data include various flight plan related data such as, for example, waypoints, distances between waypoints, headings between waypoints, data related to different airports, navigational aids, obstructions, special use airspace, political boundaries, communication frequencies, and aircraft approach information. It will be appreciated that, although the terrain databases 106, the navigation databases 108, the runway databases 110, and the obstacle databases 112 are, for clarity and convenience, shown as being stored separate from the processor 104, all or portions of either or both of these databases 106, 108, 110, 112 could be loaded into the RAM 103, or integrally formed as part of the processor 104, and/or RAM 103, and/or ROM 105. The databases 106, 108, 110, 112 could also be part of a device or system that is physically separate from the system 100.

A validated runway database 110 may store data related to, for example, runway lighting, identification numbers, position, and length, width, and hardness. As an aircraft approaches an airport, the processor 104 receives the aircraft's current position from, for example, the GPS receiver 122 and compares (verifies and monitors) the current position data with the distance and/or usage limitation data stored in the database for the landing system being used by that airport.

As the aircraft approaches the airport, the data in the validated runway database 110 is compared with other data determined by other devices such as the sensors 113. In other situations, the verified runway data such as position information may be obtained previously by repeatedly collecting data during normal operations. These statistically verified data can be used to validate navigation data during flight or during navigation database compilation processes. If the data matches, a higher level of confidence is obtained.

The sensors 113 may be implemented using various types of inertial sensors, systems, and or subsystems, now known or developed in the future, for supplying various types of inertial data. The inertial data may also vary, but preferably include data representative of the state of the aircraft such as, for example, aircraft speed, heading, altitude, and attitude. The number and type of external data sources 114 may also vary. For example, the external systems (or subsystems) may include, for example, a navigation computer. However, for ease of description and illustration, only an instrument landing system (ILS) receiver 118, an inertial navigation system 120 (INS), and a global position system (GPS) receiver 122 are depicted in FIG. 1.

As is generally known, the ILS is a radio navigation system that provides aircraft with horizontal (or localizer) and vertical (or glide slope) guidance just before and during landing and, at certain fixed points, indicates the distance to the reference point of landing on a particular runway. The system includes ground-based transmitters (not illustrated) that transmit radio frequency signals. The ILS receiver 118 receives these signals and, using known techniques, determines the glide slope deviation of the aircraft. As is generally known, the glide slope deviation represents the difference between the desired aircraft glide slope for the particular runway and the actual aircraft glide slope. The ILS receiver

118 in turn supplies data representative of the determined glide slope deviation to the processor 104.

Although the aviation embodiments in this specification are described in terms of the currently widely used ILS, embodiments of the present invention are not limited to applications of airports utilizing ILS. To the contrary, embodiments of the present invention are applicable to any navigation system (of which ILS is an example) that transmits a signal to aircraft indicating an approach line to a runway. Alternate embodiments of the present invention to those described below may utilize whatever navigation system signals are available, for example a ground based navigational system, a GPS navigation aid, a flight management system, and an inertial navigation system, to dynamically calibrate and determine a precise course. For example, a WAAS enabled GPS unit can be used to generate deviation output relative to an approach vector to a runway and produce similar type of deviation signals as a ground based ILS source.

The INS 120 is a navigation aid that uses (not shown) a computer, motion sensors (accelerometers) and rotation sensors (gyroscopes) to continuously calculate via dead reckoning the position, orientation, and velocity (direction and speed of movement) of a moving object without the need for external references. The INS 120 is periodically provided with its position and velocity by the GPS receiver 122, in the preferred embodiment, and thereafter computes its own updated position and velocity by integrating information received from the motion sensors. The advantage of an INS 120 is that it requires no external references in order to determine its position, orientation, or velocity once it has been initialized. The INS 120 can detect a change in its geographic position (a move east or north, for example), a change in its velocity (speed and direction of movement), and a change in its orientation (rotation about an axis). It does this by measuring the linear and angular accelerations applied to the system.

The GPS receiver 122 is a multi-channel receiver, with each channel tuned to receive one or more of the GPS broadcast signals transmitted by the constellation of GPS satellites (not illustrated) orbiting the earth. Each GPS satellite encircles the earth two times each day, and the orbits are arranged so that at least four satellites are always within line of sight from almost anywhere on the earth. The GPS receiver 122, upon receipt of the GPS broadcast signals from at least three, and preferably four, or more of the GPS satellites, determines the distance between the GPS receiver 122 and the GPS satellites and the position of the GPS satellites. Based on these determinations, the GPS receiver 122, using a technique known as trilateration, determines, for example, aircraft position, groundspeed, and ground track angle. These data may be supplied to the processor 104, which may determine aircraft glide slope deviation therefrom. Preferably, however, the GPS receiver 122 is configured to determine, and supply data representative of, aircraft glide slope deviation to the processor 104.

The display device 116, as noted above, in response to display commands supplied from the processor 104, selectively renders various textual, graphic, and/or iconic information, and thereby supply visual feedback to the user 109. It will be appreciated that the display device 116 may be implemented using any one of numerous known display devices suitable for rendering textual, graphic, and/or iconic information in a format viewable by the user 109. Non-limiting examples of such display devices include various cathode ray tube (CRT) displays, and various flat panel displays such as various types of LCD (liquid crystal display) and TFT (thin film transistor) displays. The display device 116 may additionally be implemented as a panel mounted display, a HUD (head-up display) projection, or any one of numerous known technologies. It is additionally noted that the display device 116 may be configured as any one of numerous types of aircraft flight deck displays. For example, it may be configured as a multi-function display, a horizontal situation indicator, or a vertical situation indicator, just to name a few. In the depicted embodiment, however, the display device 116 is configured as a primary flight display (PFD).

In operation, the display 116 is also configured to process the current flight status data for the host aircraft. In this regard, the sources of flight status data generate, measure, and/or provide different types of data related to the operational status of the host aircraft, the environment in which the host aircraft is operating, flight parameters, and the like. In practice, the sources of flight status data may be realized using line replaceable units (LRUs), transducers, accelerometers, instruments, sensors, and other well known devices. The data provided by the sources of flight status data may include, without limitation: airspeed data; groundspeed data; altitude data; attitude data, including pitch data and roll data; yaw data; geographic position data, such as GPS data; time/date information; heading information; weather information; flight path data; track data; radar altitude data; geometric altitude data; wind speed data; wind direction data; etc. The display 116 is suitably designed to process data obtained from the sources of flight status data in the manner described in more detail herein.

Figure 2:
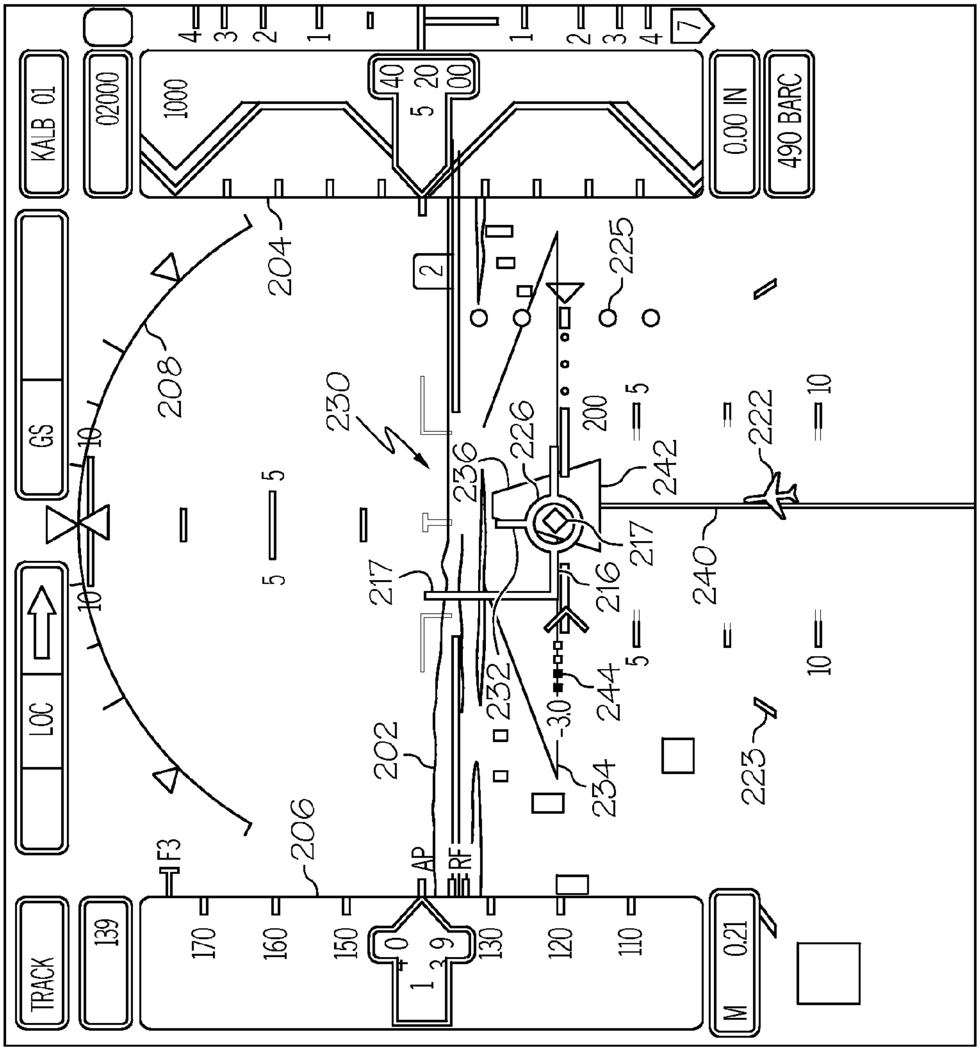
FIG. 2 is an exemplary image that may be rendered on the flight display system of FIG. 1.

Referring to FIG. 2, textual, graphical, and/or iconic information rendered by the display device 116, in response to appropriate display commands from the processor 104 is depicted. It is seen that the display device 116 renders a view of the terrain 202 ahead of the aircraft, preferably as a three-dimensional perspective view, an altitude indicator 204, an airspeed indicator 206, an attitude indicator 208, and a flight path vector indicator 216. Additional information (not shown) is typically provided in either graphic or numerical format representative, for example, of glide slope, altimeter setting, and navigation receiver frequencies.

An aircraft icon 222 is representative of the current heading direction relative to the specific runway 226 on which the aircraft is to land. The desired aircraft direction is determined, for example, by the processor 104 using data from the navigation database 108, the sensors 113, and the external data sources 114. It will be appreciated, however, that the desired aircraft direction may be determined by one or more other systems or subsystems, and from data or signals supplied from any one of numerous other systems or subsystems within, or external to, the aircraft. Regardless of the particular manner in which the desired aircraft direction is determined, the processor 104 supplies appropriate display commands to cause the display device 116 to render the aircraft icon 222.

The flight path marker 216 is typically a circle with horizontal lines (representing wings) extending on both sides therefrom, a vertical line (representing a rudder) extending upwards therefrom, and indicates where the plane is "aimed". One known enhancement is, when the flight path marker 216 blocks the view of another symbol on the screen 116, the portion of the flight path marker 216 that is blocking the other symbol becomes transparent.

An acceleration cue 217 is a marker, sometimes called a "carrot", on or near one of the horizontal lines of the flight path marker 216. The marker 217 typically moves vertically upward, when the plane accelerates (or the wind increases), or vertically downward, or becomes shorter, when the plane decelerates.

Perspective conformal lateral deviation symbology provides intuitive displays to flight crews of current position in relation to an intended flight path. In particular, lateral deviation symbology indicates to a flight crew the amount by which the aircraft has deviated to the left or right of an intended course. Lateral deviation marks 223 and vertical deviation marks 225 on perspective conformal deviation symbology represent a fixed ground distance from the intended flight path. As the aircraft ascends or descends, the display distance between the deviation marks 223, 225 will vary. However, the actual angular distance from the intended flight path represented by the deviation marks 223, 225 remains the same. Therefore, flight crews can determine position information with reduced workload by merely observing the position of the aircraft in relation to the deviation marks 223, 225. Regardless of attitude or altitude, flight crews know how far off course an aircraft is if the aircraft is a given number of deviation marks 223, 225 from the intended flight path.

The lateral deviation marks 223 are lateral deviation indicators used to provide additional visual cues for determining terrain and deviation line closure rate. The lateral deviation marks 223 are used to represent both present deviations from the centerline of the runway 226 and direction of aircraft movement. Thus, the lateral deviation marks 223 provide a visual guide for closure rate to the centerline allowing the pilot to more easily align the aircraft with the runway 226. The processor 104 generates the lateral deviation marks 223 based on current aircraft parameters obtained from the navigation database 108 and/or other avionic systems. The lateral deviation marks 223 may be generated by computing terrain-tracing projection lines at a number of fixed angles matching an emission beam pattern of the runway ILS beacon. Sections of the terrain-tracing lines in the forward looking perspective display view may be used to generate the lateral deviation marks 223.

Terrain augmented conformal lateral and vertical deviation display symbology improves a pilot's spatial awareness during aircraft approach and landing. The pilot may be able to quickly interpret the symbology and take actions based on the elevation of the surrounding terrain. As a result, aircraft navigation may be simplified, pilot error and fatigue may be reduced, and safety may be increased.

Figure 3:
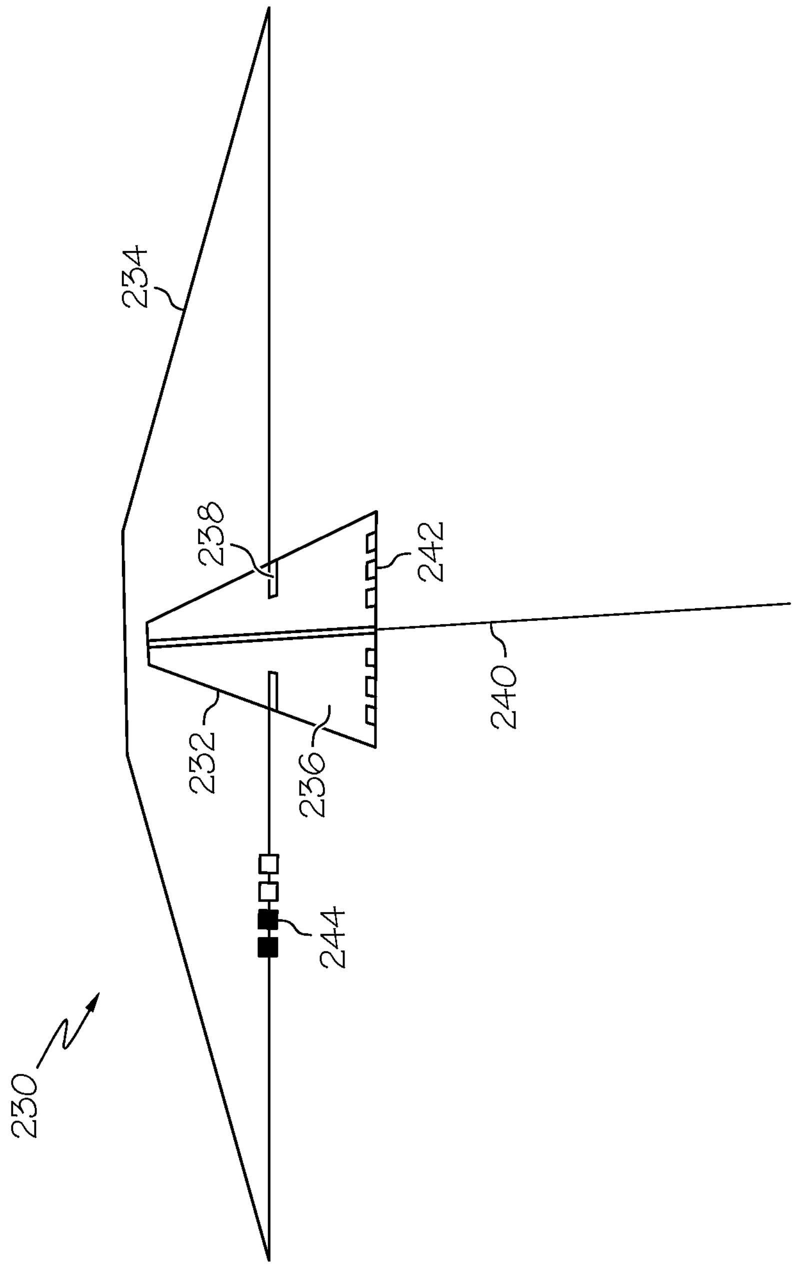
FIG. 3 is a partial exemplary image of that shown in FIG. 2.

In accordance with an exemplary embodiment, a runway position indicator 230 is provided that includes a runway outline 232, a runway symbol 234, a textured runway 236, a touchdown zone 238, an approach course 240, a runway threshold 242, and a virtual PAPI 244. These items are shown in FIG. 3 in addition to FIG. 2 for illustration.

Runway Outline

The cyan colored runway outline 232 around the edges of the runway provides delineation of runway of intended landing along with motion and location cues to the pilot when the range to the runway is not too long. The position, length, and width of the runway are stored in the runway database 110 for a plurality of runways. When a desired runway is selected (on which a landing is to be made), the size of the runway outline 232 is calculated.

Runway Symbol

The super-sized cyan colored intended runway symbol 234 is visible on the display screen at large distances from the runway. It emanates from the Touchdown Zone and provides cues as to where the runway is, perspective cues to the runway and the location of the touchdown zone. The dynamic sizing of the Runway Symbol 234 provides motion cues in all dimensions, i.e. up/down, left/right and forward motion flow including sense of ground closure. The size of the runway symbol 234 is determined by software based on the runway size, the altitude, and attitude of the aircraft distance to the approaching runway. The symbol size change may not be linearly related to the distance to the runway. Generally, the size of the runway symbol 234 is about up to twice the runway length and about up to six times the width of the runway when close by.

For example, when runway is more than 20 miles away, the symbol box may be twice the length but more than 10 times the width of the runway in order to facilitate the visual identification of the intended landing area on the display due to perspective view size reduction at distance. As the aircraft flies closer to the runway, for example, at 4 miles, the symbol box may become six times of the runway width.

One way to calculate the symbol width can be done as Width=dw*f where dw is the database runway width and f is the size adjusting factor. For example, the term f is equal to 10 if distance to runway is larger than 20 NM. The term f can be reduced linearly from 10 to 6 when distance to the approaching runway is reduced from 20 to 4 NM, and f=6 if runway is less than 4 NM away.

Textured Runway

The runway 236 is textured, for example, in gray with cyan runway number and muted white centerline provides motion and location cues when range to the runway is extremely short.

Touchdown Zone

The cyan colored touchdown zone 238 is calculated from the runway database 110 values gathered from the Aeronautical Information Publication and is visible on the display screen at large distances from the runway. It is the "point of reference" of the flight director (FD). The flight director is providing commands to "fly" the flight-path vector symbol to the touchdown zone. Also, the pilot can fly "flight path reference line" (not shown) over touchdown zone symbology to ensure that the aircraft is on the proper glide path. The touch down zone symbols include the rendered marking area on the runway and the leading edge of the runway symbol box centered at the touch down zone.

Approach Course

The cyan approach course symbol 240 extends, preferably, about 32 kilometers, from the runway and is visible at large distances from the runway. It provides alignment cues to the approach course.

Virtual PAPI

The shades of red to white virtual precision path approach indicator (PAPI) 244 symbol is derived from approach aircraft position data and runway database values. It provides intuitive vertical glide path cues to the pilot. The virtual PAPI indicates the calculated deviation from the published glide slope angle to the touch down point. It is an independent indication from a typical ground based glide slope source. As an example, the current aircraft altitude and position measurement relative to the touch down zone can be used to generate a glide slope, independent of the primary guidance. When the generated slope matches that of published value, the virtual PAPI is shown as two red and two white. As such, if this display is very different from primary guidance displayed glide slope, cockpit cross check would be indicated or initiated.

The system and method disclosed herein provides the pilot with supplementary guidance by supporting the pilot's ability to fly a stabilized approach, verifying the aircraft is continuously in a position to complete a normal landing using normal maneuvering, and facilitates a guided search for the landing runway aiding the pilot in the visual acquisition of the landing runway environment, and below decision height or minimum descent altitude, supports the pilot's ability to continue normal flight path to the intended runway. The runway position indicator 230 and the flight director 428 enables the use of the runway symbol 234 as an air point in addition to the traditional decision point in space. The runway position indicator 230 provides a means to verify the primary guidance information for standard approach guidance, and utilizes a separate process to produce and display the runway guidance symbol 240. The runway position indicator 230 is positioned with high precision instruments including the inertial navigation system 120 and the global positioning system 122.

In the "instrument segment" of an approach procedure the runway position indicator 230 provides supplementary guidance to support the pilot's ability to fly a stabilized approach. The runway position indicator 230 provides cues that facilitate the pilot's understanding and improve performance when manually flying "raw data," when flying a Flight-Path Director (FPD, computer 428 of FIG. 4), or when coupled to the autopilot on approach. Flight-Path Director commands (climb, descend, turn left or right) are given bigger context when presented in a conformal way with-respect-to the runway depiction. The FPD command (i.e., the FPD symbol 217) is seen relative to the runway analog and the Flight Path Vector Symbol 216 which provides a sense of magnitude and direction to a given FPD command.

In the "instrument segment" of an approach procedure, the runway position indicator 230 provides cues to verify that the aircraft is continuously in a position to complete a normal landing using normal maneuvering. The runway position indicator 230 is used to confirm the aircraft's position with respect to the intended landing runway. The runway position indicator 230 is a natural analog of the real world and easy to interpret, whereas the pilot is utilizing the same skills as when flying visually.

During the "instrument segment" of an approach procedure, prior to the DA(H) or MDA, the runway position indicator 230 facilitates a "guided search" for the landing runway, aiding the pilot in the visual acquisition of landing runway environment as the pilot gains natural vision of the outside world. Expected crew action is to use the runway position indicator 230 and associated symbology as an aid in visually acquiring the intended landing runway. The symbology produces a cognitive perception or "visual-flow" toward the landing runway. The visual analog of the "runway environment" is a comprehensive picture of the landing surface, including: runway markings, all airport runways (including runways not intended for landing), touchdown zone location, indications of lateral cross track, "drift-angle," vertical descent guidance and distance to the touchdown zone. The "intended landing runway" is graphically differentiated from other airfield runways.

Below DH(A), the runway position indicator 230 supports the pilot's ability to continue normal path to intended runway of landing. In the "visual segment" of an instrument approach procedure, the runway position indicator 230 presents cues that augment and aid the pilot in the visual maneuver to the landing runway. In low visibility conditions, the transition between instrument flight and visual flight is especially challenging. During the transition to visual flight, it is common practice for the pilot to divide cognitive attention between the outside view and the instruments to insure a stabilized path is maintained. The runway position indicator 230 is a real world analog and included symbology elements that are easy interpret. This reduces the time required to read the flight instruments and smooth the progress of the pilot's transition to landing.

Figure 4:
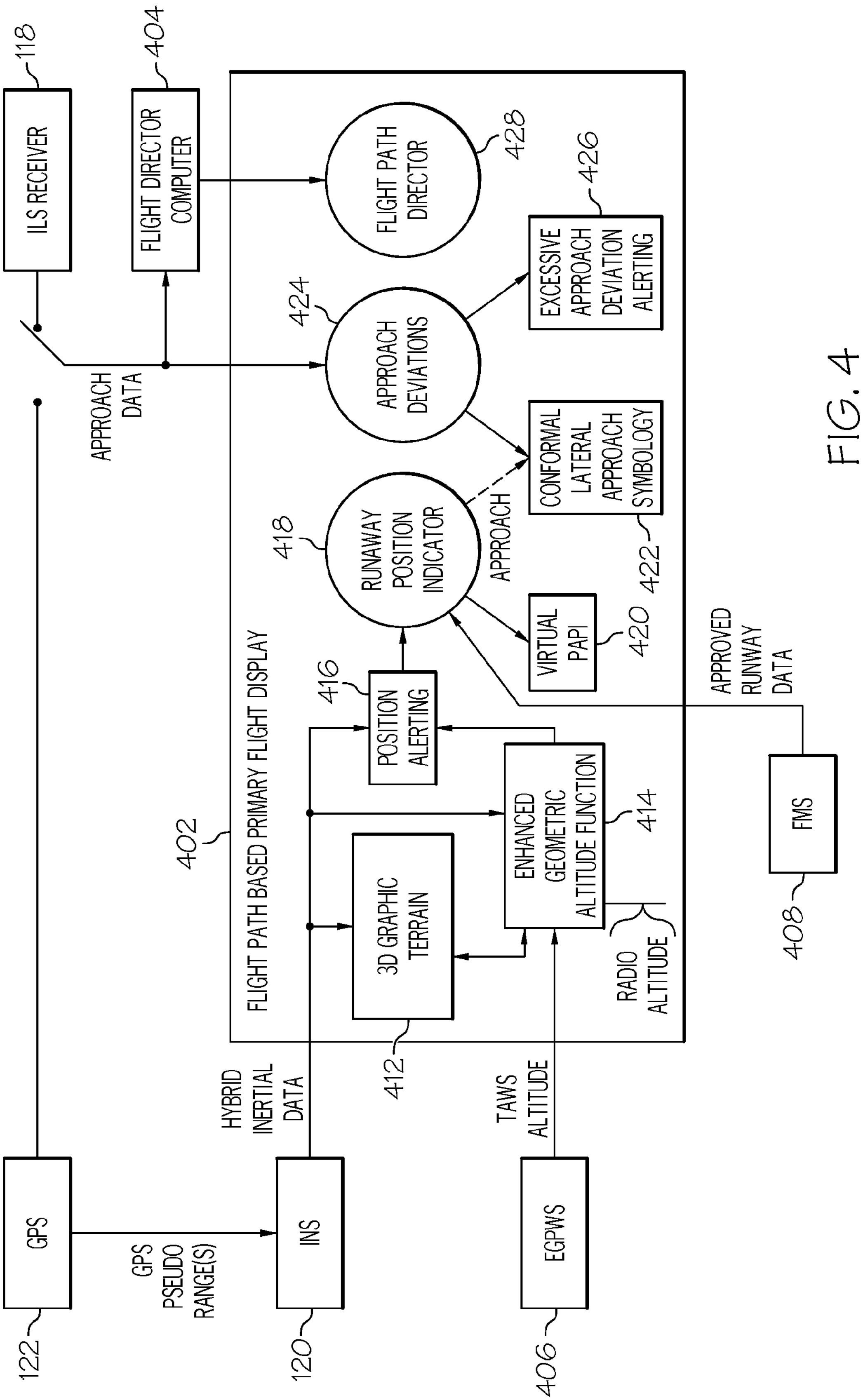
FIG. 4 is a functional block diagram of a display included in FIG. 1.

Referring to the block diagram of FIG. 4, a display system 402, which includes the display 116, is coupled to the inertial navigation system 120, the GPS system 122 the ILS receiver 118, a flight director computer 404, a terrain awareness and warning system 406, and a flight management system 408 which includes the terrain database 106. While the ILS receiver 118 is the primary provider of approach information, the GPS receiver 122 serves as backup and confirmation of the ILS data. If the ILS receiver 118 is temporally lost, the GPS information may be used to complete the approach. Furthermore, the GPS information is supplied to the inertial navigation system 120, and if the GPS data is temporally lost, the inertial navigation system 120 may be used to complete the approach.

The display system 402 includes a three dimensional graphic terrain function 412 including a visualization terrain and obstacle databases (not shown), an enhanced geometric altitude function 414, a position alerting function 416, a runway position indicator 230 function 418, a virtual PAPI function 420, a conformal lateral approach symbology function 422, an approach deviations function 424, an excessive approach deviation alerting function 426, and a flight path director 428.

The ILS receiver 118 glide slope information is provided to the flight director computer 404, which in turn, provides the information to the flight path director 428. The glide slop information is also provided to the display system 402 to determine approach deviations 426. The approach deviations are used to display conformal lateral approach symbology 422 such as the lateral deviations marks 223 and to provide an alert message (excessive approach deviation alerting function) 426 if excessive approach deviations are determined. If a signal from the ILS receiver 118 is temporarily unavailable, the approach deviations may be determined from information provided by the GPS 122.

The GPS 122 provides position and altitude data to the INS 120, which in turn, provides hybrid inertial data for providing data to the graphic terrain 412, the enhanced geometric altitude function 414, and for position alerting 416 (for example, with regards to position accuracy and integrity of the runway position indicator 230, and with respect to the primary guidance and the runway position indicator 230). Data (TAWS altitude) from the emergency ground proximity warning system 406 is provided to the enhanced geometric altitude function 414. The INS 120 combines GPS 122 position data which is updated less frequently with inertial sensor data to provide continuous position information. When the GPS 122 is temporarily unavailable, the INS 120 can still predict in short term the aircraft position change using the integrated inertial data. When these position changes are added to the position determined at the time of GPS 122 availability, the short term absolute position (latitude, longitude, and altitude) of an aircraft can be accurately determined In addition, INS 120 data can be used to monitor certain GPS 122 data anomalies such as sudden data jump due to interferences as this type short term behavior is not present in the integrated inertial sensor data, allowing the system to reject these types of faulty inputs.

Figure 5:
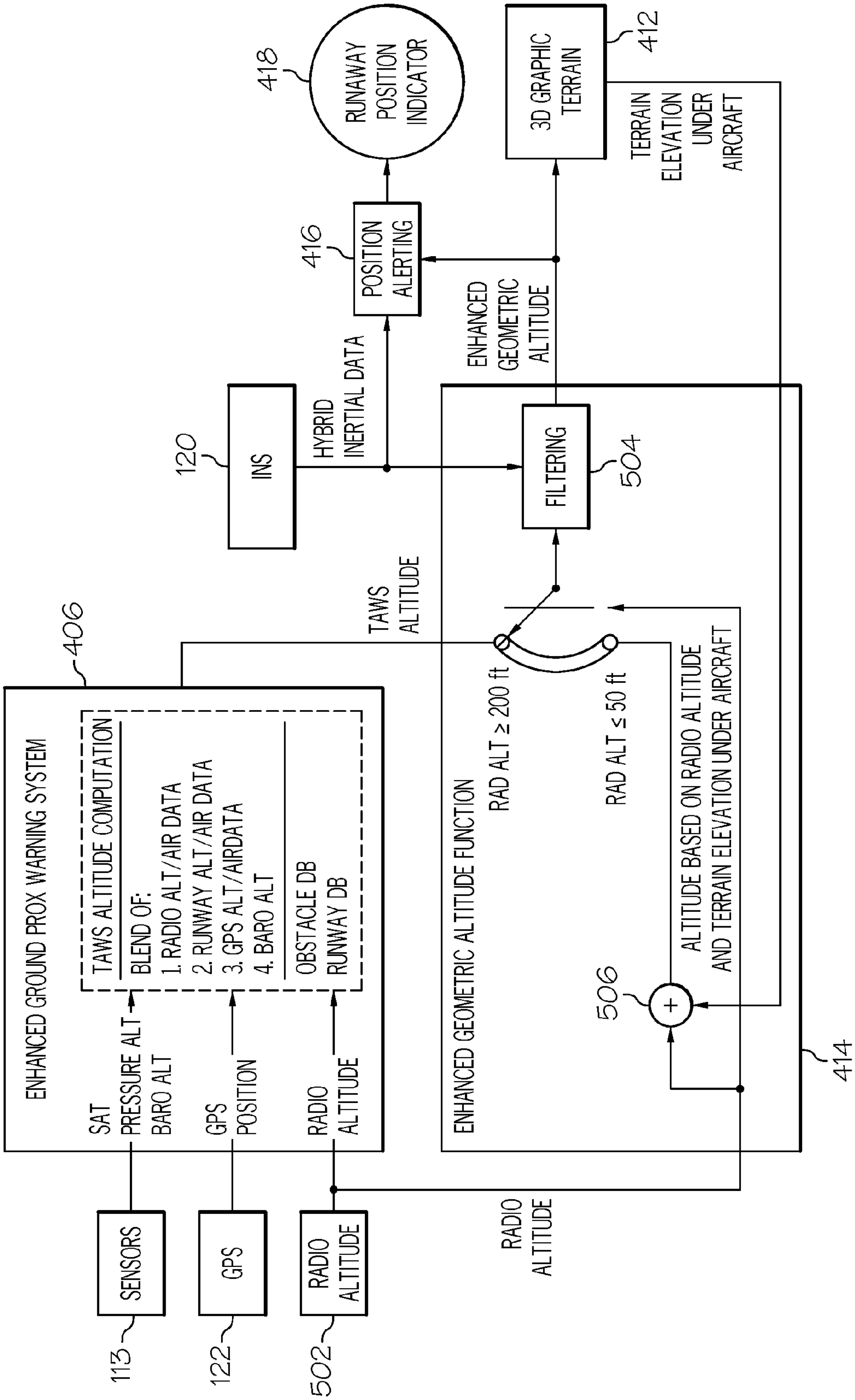
FIG. 5 is a functional block diagram of an enhanced geometric altitude function provided in FIG. 1.

The operation of the enhanced geometric altitude function 414 may be understood with reference to FIG. 5. A radio altitude 502 is provided to the terrain awareness and warning system 406 and the enhanced geometric altitude function 414. After being combined 506 with the terrain elevation under the aircraft (provided by the 3D graphic terrain 412), the result is filtered 504 with the hybrid inertial data from the INS 120, resulting in an enhanced geometric altitude. When an aircraft approaches (getting closer to) a runway at lower altitude, its relative altitude to the ground and landing runway is more important both for safe landing and for displaying correct perspective view to the flight crews. With available radar altitude 502, verified runway data, and reliable terrain data, one can increase the signal weight of radar altitude components into the absolute altitude determination. The dynamic altitude behavior, however, is given by the inertial navigation system 120 indicated altitude behavior as it reflects true aircraft altitude change.

In an ILS approach, the aircraft receives beams from the ground to determine both vertical (glide slope) and lateral (localizer beam) deviation signals and feed the signal to flight control systems and display the raw data to flight to flight crews.

In a WAAS LPV based approach, an augmented GPS signal is received and is compared to an surveyed approach vector position. Lateral and vertical deviations relative to the approach vector are calculated based on the WAAS signal. These deviations are generated into a similar format as an ILS approach and are sent to a flight control systems. An augmented GPS signal can have significant better accuracy than none-augmented GPS signal. The augmented signal based on the ground station transmissions to Geo Sync satellite system (WAAS) can behave differently from the non-augmented GPS signal.

Figure 6:
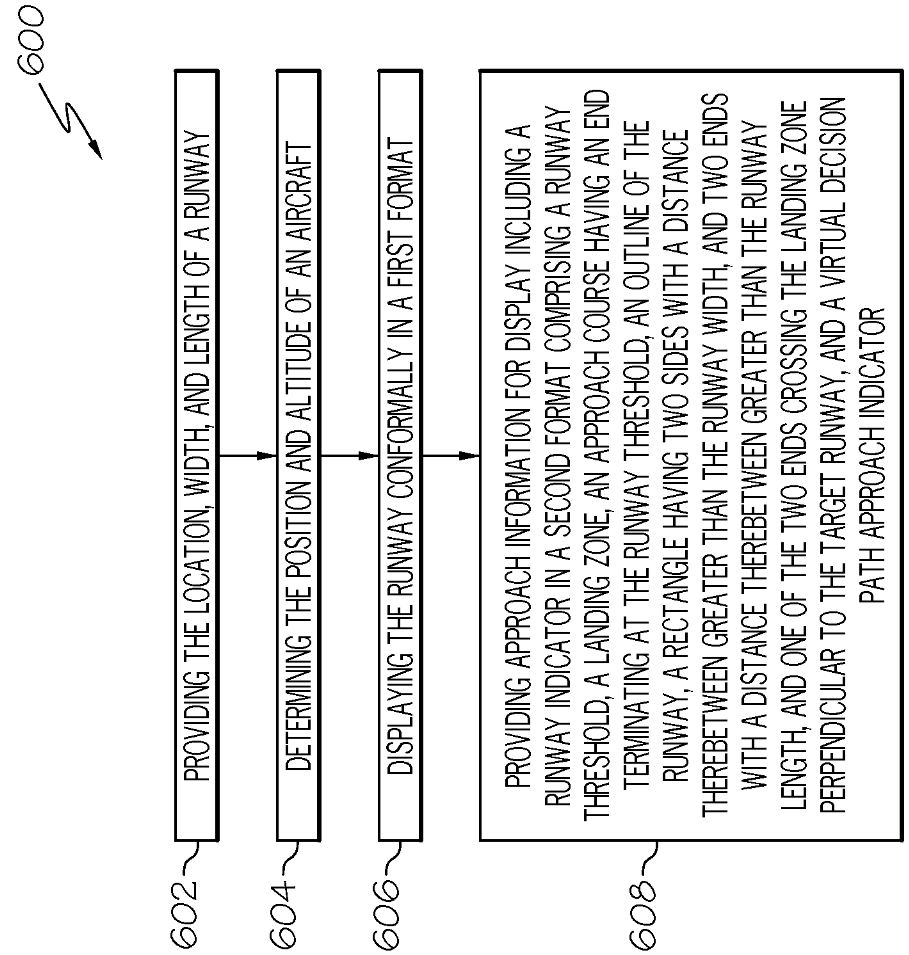
FIG. 6 is a flow chart of a method in accordance with an exemplary embodiment.

FIG. 6 is a flow chart that illustrates an exemplary embodiment of a display process 600 suitable for use with a display system 402. Process 600 represents one implementation of a method for displaying aircraft approach information on an onboard display of an aircraft. The various tasks performed in connection with process 600 may be performed by software, hardware, firmware, or any combination thereof. For illustrative purposes, the following description of process 600 may refer to elements mentioned above in connection with the preceding FIGS. In practice, portions of process 600 may be performed by different elements of the described system, e.g., a processor, a display element, or a data communication component. It should be appreciated that process 600 may include any number of additional or alternative tasks, the tasks shown in FIG. 6 need not be performed in the illustrated order, and process 600 may be incorporated into a more comprehensive procedure or process having additional functionality not described in detail herein. Moreover, one or more of the tasks shown in FIG. 6 could be omitted from an embodiment of the process 600 as long as the intended overall functionality remains intact.

The process 600 includes providing 602 the location, width, and length of a runway, determining 604 the position and altitude of an aircraft; displaying 606 the runway conformally in a first format, and providing 608 approach information for display including a runway indicator in a second format comprising a runway threshold, a landing zone, an approach course having an end terminating at the runway threshold, an outline of the runway, a rectangle having two sides with a distance there between greater than the runway width, and two ends with a distance therebetween greater than the runway length, and one of the two ends crossing the landing zone perpendicular to the target runway, and a virtual decision path approach indicator.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed is:

1. A vision system for an aircraft, comprising:

a system configured to determine a position and dimensions of a target runway, the system including a flight director configured to provide an approach vector; and a display coupled to the system and configured to display a conformal runway representing the target runway and a highlighted runway indicator, the conformal runway having an approach end, a departure end, a first side, and a second side, the runway indicator comprising:

a threshold at the approach end;

a line indicating an approach course having an end terminating at the runway threshold;

an outline on the approach end, departure end, first side, and second side of the conformal runway;

a rectangle surrounding the conformal runway having two sides with a distance therebetween greater than the runway width, and two ends with a distance therebetween greater than the runway length, and one of the two ends crossing the landing zone perpendicular to the conformal runway, the size, perspective, and position of the rectangle based on the target runway size, altitude, and attitude;

a touchdown zone on the conformal runway near the approach end, the touchdown zone calculated from a runway database, the flight-path vector terminating at the touchdown zone and its position based on the target runway size, and aircraft altitude and attitude; and a virtual precision path approach indicator derived from approach aircraft position data and the runway database.

2. The vision system of claim 1 wherein the display is further configured to display pavement marking of the target runway on the conformal runway.

3. The vision system of claim 1 wherein the display is further configured to display an aim point on the conformal runway for landing the aircraft on the target runway.

4. The vision system of claim 1 wherein the system comprises a runway database including positions and dimensions of a plurality of runways.

5. The vision system of claim 1 wherein the system comprises a global positioning system providing the position of the aircraft.

6. The vision system of claim 5 wherein the system comprises an inertial navigation system confirming a continuous reading from the global positioning system of the position of the aircraft.

7. The vision system of claim 1 wherein the system comprises an instrument landing system providing the position of the aircraft.

8. A vision system for an aircraft, the vision system comprising:

a runway database comprising lengths, widths, and locations of a plurality of runways;

a global positioning system configured to determine data including a position and an altitude of the aircraft;

an inertial navigation system configured to track changes in the position and the altitude, and to reject spurious data;

a computer configured to provide approach information from one of, in order of availability, the global positioning system and the inertial navigation system; and a display coupled to the computer and configured to display the approach information, wherein the approach information comprises:

a target runway, selected from the plurality of runways, including length and width from the runway database; and a highlighted runway indicator comprising:

a runway threshold;

an approach vector indicating an approach course having an end terminating at the runway threshold;

an outline surrounding edges of the target runway;

a rectangle surrounding the target runway and having two sides with a distance therebetween greater than a target runway width, and two ends with a distance therebetween greater than a target runway length, and one of the two ends crossing the landing zone perpendicular to the target runway, the size, perspective, and position of the rectangle based on the target runway size, altitude, and attitude;

a touchdown zone on the conformal runway near the approach end, the touchdown zone calculated from a runway database, the flight-path vector terminating at the touchdown zone and its position based on the target runway size, and aircraft altitude and attitude; and a virtual precision path approach indicator derived from approach aircraft position data and the runway database.

9. A method for providing a runway indicator for assisting a pilot of an aircraft to complete an approach for landing, comprising:

providing a location, width, and length of a target runway;

determining the position and altitude of the target aircraft;

providing a flight-path vector symbol;

displaying a conformal runway in a first format, the conformal runway having an approach end, a departure end, a first side, and a second side;

providing the runway indicator in a second format, comprising:

displaying a runway threshold at the approach end;

displaying an approach course having an end terminating a the runway threshold;

displaying an outline of the conformal runway;

displaying a rectangle surrounding the conformal runway having two sides with a distance therebetween greater than the conformal runway width, and two ends with a distance therebetween greater than the conformal runway length, the sides positioned on opposed sides of the conformal runway, one end positioned on the landing zone perpendicular to the conformal runway, and the other end beyond the conformal runway, the size, perspective, and position of the rectangle based on the target runway size, altitude, and attitude;

displaying a touchdown zone near the conformal runway threshold, the touchdown zone calculated from a runway database, the flight-path vector terminating at the touchdown zone and its position based on the target runway size, and aircraft altitude and attitude; and displaying a path approach indicator derived from approach aircraft position data and the runway database.

10. The method of claim 9 further comprising displaying pavement marking of the target runway on the conformal runway.

11. The method of claim 9 further comprising displaying an aim point on the conformal runway for landing the aircraft on the runway.

12. The method of claim 9 selecting the runway from a runway database including positions and dimensions of a plurality of runways.

13. The method of claim 9 further providing the position of the aircraft by a global positioning system.

14. The method of claim 9 further comprising confirming, by an inertial navigation system, a continuous reading from the global positioning system of the position of the aircraft.

15. The method of claim 9 further providing the position of the aircraft by an instrument landing system.

* * * * *